(12) United States Patent
McClain

(10) Patent No.: US 7,373,110 B1
(45) Date of Patent: May 13, 2008

(54) PERSONAL COMMUNICATION SYSTEM, DEVICE AND METHOD

(76) Inventor: John McClain, 105 Barrington Pl., Los Angeles, CA (US) 90049

( * ) Notice: Subject to any disclaimer, the term of this patent is extended or adjusted under 35 U.S.C. 154(b) by 345 days.

(21) Appl. No.: 11/008,707

(22) Filed: Dec. 9, 2004

(51) Int. Cl.
H04B 7/00 (2006.01)
(52) U.S. Cl. .................... 455/41.2; 455/66.1
(58) Field of Classification Search ......... 455/3.05, 455/3.06, 41.2, 66.1, 90.3; 84/615; 707/5
See application file for complete search history.

(56) References Cited

U.S. PATENT DOCUMENTS

| | | |
|---|---|---|
| 3,851,875 A | 12/1974 | Breslow et al. |
| 3,855,998 A | 12/1974 | Hidalgo-Briceno |
| 4,041,617 A | 8/1977 | Hollander |
| 4,173,016 A | 10/1979 | Dickson |
| 4,184,344 A | 1/1980 | Pepin |
| 4,331,160 A | 5/1982 | Zito, Sr. |
| 4,358,118 A | 11/1982 | Plapp |
| 4,733,383 A | 3/1988 | Waterbury |
| 5,086,394 A | 2/1992 | Shapira |
| 5,089,745 A | 2/1992 | Iannini |
| 5,217,379 A | 6/1993 | Kirschenbaum et al. |
| 5,228,879 A | 7/1993 | Fromm |
| 5,337,041 A | 8/1994 | Friedman |
| 5,444,437 A | 8/1995 | Layher |
| 5,572,592 A | 11/1996 | Muckelrath |
| 5,587,823 A * | 12/1996 | Yoshino et al. ............ 398/107 |
| 5,616,876 A * | 4/1997 | Cluts .......................... 84/609 |
| 5,860,935 A | 1/1999 | Blaszynski et al. |
| 6,043,747 A | 3/2000 | Altenhofen |
| 6,178,923 B1 | 1/2001 | Plotkin |
| 6,277,079 B1 | 8/2001 | Avicola et al. |
| 6,292,283 B1 * | 9/2001 | Grandbois ................. 398/107 |
| 6,368,176 B1 | 4/2002 | Lozowski et al. |
| 6,412,775 B1 | 7/2002 | Dear |
| 6,414,906 B1 | 7/2002 | Gaspari |
| 6,487,180 B1 | 11/2002 | Borgstahl et al. |
| D468,648 S * | 1/2003 | Starck ........................ D10/38 |
| 6,527,610 B1 | 3/2003 | Hornsby et al. |
| 6,549,768 B1 | 4/2003 | Fraccaroli |
| 6,593,851 B1 | 7/2003 | Bornstein |

(Continued)

Primary Examiner—Lana Le
Assistant Examiner—April S. Guzman
(74) Attorney, Agent, or Firm—Schweitzer Cornman Gross & Bondell LLP

(57) ABSTRACT

A personal communication system has first and second portable communication devices, each device including a display, a wireless transceiver, a memory having a plurality of stored audio files, a means to select one of the audio files, the audio file selection means being operable to permit a user to select one of the audio files, and an audio speaker. The wireless transceiver of the first device is operable to transmit a signal identifying an audio file selected by the user and the wireless transceiver of the second device is operable to receive the signal, and, upon receipt of the signal, to play the selected audio file on the audio speaker of the second device. The memory includes one or more attributes for each stored audio file, the attributes comprising a sequence attribute, a message type attribute or a target gender attribute. The sequence, message type or target gender attribute have one or more of a plurality of predetermined values and are associated with a characteristic of a song from which an associated audio file is obtained. The device is also operable to receive one or more selections from the user of the predetermined values of the sequence, message type or target gender attributes.

10 Claims, 1 Drawing Sheet

U.S. PATENT DOCUMENTS

| | | | |
|---|---|---|---|
| 6,735,430 B1* | 5/2004 | Farley et al. | 455/414.1 |
| 6,757,517 B2* | 6/2004 | Chang | 455/3.05 |
| 6,757,574 B2 | 6/2004 | Gardner et al. | |
| 6,791,020 B2* | 9/2004 | Hughes | 84/609 |
| 7,003,515 B1* | 2/2006 | Glaser et al. | 707/5 |
| 7,142,807 B2* | 11/2006 | Lee | 455/3.01 |
| 7,171,174 B2 | 1/2007 | Ellis et al. | 455/132 |
| 2002/0168938 A1* | 11/2002 | Chang | 455/41 |
| 2003/0089218 A1* | 5/2003 | Gang et al. | 84/615 |
| 2003/0195863 A1* | 10/2003 | Marsh | 707/1 |
| 2004/0063444 A1* | 4/2004 | Tissot et al. | 455/466 |
| 2004/0097194 A1* | 5/2004 | Karr et al. | 455/41.2 |
| 2004/0102215 A1* | 5/2004 | Karr et al. | 455/552.1 |
| 2004/0193649 A1* | 9/2004 | Doshida et al. | 707/104.1 |
| 2004/0224638 A1* | 11/2004 | Fadell et al. | 455/66.1 |
| 2005/0106546 A1* | 5/2005 | Strom | 434/307 A |
| 2005/0202788 A1* | 9/2005 | Vinson et al. | 455/90.3 |
| 2006/0199540 A1* | 9/2006 | Oh-Yang et al. | 455/41.2 |
| 2006/0206478 A1* | 9/2006 | Glaser et al. | 707/5 |
| 2006/0212442 A1* | 9/2006 | Conrad et al. | 707/5 |
| 2006/0212444 A1* | 9/2006 | Handman et al. | 707/5 |

\* cited by examiner

PERSONAL COMMUNICATION SYSTEM, DEVICE AND METHOD

FIELD OF THE INVENTION

The invention pertains to the field of personal communication systems, devices and methods, and in particular to personal communication systems, devices and methods for communication between persons in social environments.

BACKGROUND AND SUMMARY OF THE INVENTION

The present invention provides an entertaining and effective system, device and method to facilitate communication between persons, and in particular to between persons in social environments. The system includes a number of personal, portable communication devices each having a display, a wireless transceiver, a memory holding a number of audio files, an audio speaker, and an interface to allow the user to select and transmit one of the stored audio files.

Preferably each device contains a variety of audio files some having generally positive or negative messages, some being suitable for a communication to a male or female, and some being more suitable for invitation or a reply.

In use, a first user selects an audio file to send to the device of a second person. This is done by scrolling through the list of audio files in the display. The user then aims the transceiver of the device toward the device of the second user and depresses the "Send" button, which causes the wireless transceiver to transmit a preferably narrow-beam wireless (e.g., infra-red) signal to the device of the second user. After receiving the signal, the device of the second user locates and plays the audio file selected by the first user. The second user can then choose an appropriate audio file to transmit back to the first user in reply.

BRIEF DESCRIPTION OF THE DRAWINGS

For a complete understanding of the above and other features of the invention, reference shall be made to the following detailed description of the preferred embodiments of the invention and to the accompanying drawings, wherein.

DESCRIPTION OF THE PREFERRED EMBODIMENTS

Figure 1:
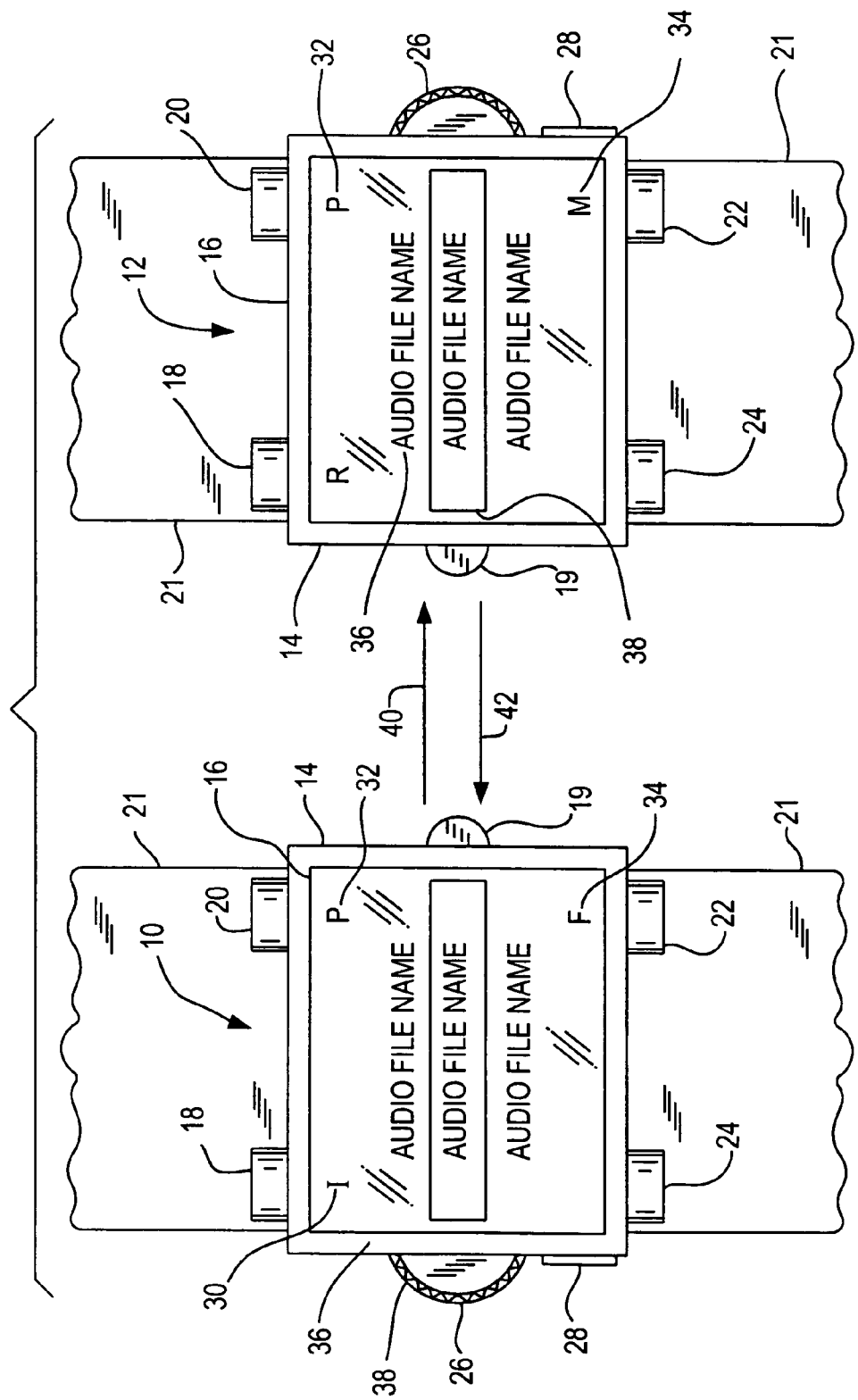
FIG. 1 is a schematic drawing of two devices made in accordance with the invention.

Referring to FIG. 1, the system of the present invention includes first and second portable, personal communication devices 10, 12, each preferably in the form of a multi-function wrist watch. Each device has a body 14, a multi-function display 16, a wireless transceiver 19, a plurality of attribute selection buttons 18, 20, 22, a send button 24, a scroll wheel 26, a memory (not shown), an audio speaker 28 and a power source (not shown). If, as preferred, each device is in the form of a wrist watch, each device also includes time-keeping electronics and a time display (not shown) and a wrist band 21.

The memory includes a plurality of audio files stored therein. Preferably, such audio files are abbreviated portions or refrains of well-known songs. Alternatively, the audio files may include verbal or spoken word messages. The memory also includes identification codes and certain attribute values for each audio file. The attributes may include a sequence attribute, a message type attribute or a target gender attribute. Each attribute has one or more of a set of predetermined values. For example, the sequence attribute may have an invitation value, a reply value or an all-sequence value. The message type attribute may have a positive message value, a negative message value, an equivocal message value or an all-message value. Other or further gradations of the message type attribute are also possible, such as a strong positive value and a strong negative value. The target gender attribute may have a male value, a female value or an all-gender value. The attributes of the audio files may be pre-set or may be set by the user and/or modified by the user.

The attributes of the audio files are set according to the characteristics of the audio file, which characteristics may pertain to the words, lyrics, style, artist and overall message of the audio file. The value of the sequence attribute is set according to whether the audio file is generally of a type suitable for an invitation to another person, a reply to an invitation from another person, or both. The value of the message type attribute is set according to whether the audio file is generally of a type suitable for a positive message, a negative message, an equivocal message, or all. The target gender attribute is set according to whether the audio file is generally of a type suitable for a communication to a male, a female, or both.

Each device 10, 12 includes means to select one of the stored audio files. A user may select one of the audio files by scrolling through an entire list of the stored audio files using the scroll wheel 26, which audio files are visible on the display 16. Alternatively, the audio files may be separated into two lists based on the target gender attribute. The user may select one of the lists by depressing one of the buttons 18, 20, 22 (or in another suitable manner) and then scroll through the chosen list. In another alternative, the user may select an audio file by selecting desired attributes for the audio file. Such user attribute selections are made with the attribute selection buttons 18, 20, 22.

Preferably, each attribute selection button 18, 20, 22 is operable to loop through the predetermined values for the associated attribute in a predetermined order, with the currently selected attribute being displayed on the display 16. For example, depressing the sequence attribute button 18 multiple times will loop through the predetermined sequence attribute values, such as the invitation value, the reply value, the all-sequence value, and then back to the invitation value. The currently selected attribute is preferably indicated in the display by a representative symbol 30, such as a character "I", "R" or "A", indicating the invitation value, reply value or all-sequence value, respectively. Other representative symbols, such as graphic symbols are also possible.

The other two attribute selection buttons 20, 22 preferably function in a similar manner. For example, the message type attribute selection button 20 may loop through the message type values of the positive message value "P", the negative message value "N", the equivocal message value "E", the all message value "A", and then back to the positive message value. Similarly, the target gender type attribute selection button 24 may loop through the target gender values of the male value "M", the female value "F" and the all gender value "A." The currently selected attributes are preferably indicated in the display by representative symbols 32, 34. Preferably, each device 10,12 retains the previous attribute selection (until changed) such that repeated attribute selections (such as the target gender) need not be selected each time.

The multi-function display 16 of each device is operable to display an audio file list 36 of one or more of the audio files stored in the memory. The list 36 preferably includes at least a name of the audio file, but may include other information about the audio file, such as the artist and album. The audio file list 36 may also include the attribute values for each displayed audio file.

Preferably, the display 16 is operable to show a plurality of audio files at one time, however the length of the audio file list will typically exceed the capacity of the display 16, so the scroll wheel 26 is operable to permit the user to scroll through the list. A currently selected audio file 38 may be distinguished from the other currently-displayed audio files by a visual indicator such as highlighting, a bold font, or some other visual indicator.

Preferably, the audio file list 36 is limited to audio files having attributes matching those selected by the user. Thus, the user is able to limit or decrease the length of the audio file list 36 by selecting specific attributes. Preferably, the audio file list 36 is updated when the user makes a new attribute selection. As can be appreciated, the user may still scroll through an entire list of audio files by selecting the "All" values for the various attributes.

Depressing the send button 24 on the first device 10 causes the wireless transceiver 18 of the device 10 to transmit a first signal 40 representative of the selected audio file 38. Preferably, the signal consists of a predetermined identification code for the selected audio file 38. Alternatively, the signal may consist of or include the entire selected audio file 38.

Preferably, the first signal 40 is transmitted at a strength sufficient to be received by another device within a distance of about 15 to 20 feet. Further, the signal 40 is transmitted in a narrow beam in a predetermined direction from the device 10 such that the user may target a particular person to receive the transmission at such a distance.

The second device 12 receives the first signal 40 and plays the selected audio file 38 on the audio speaker 28 of the second device 12. If the first signal 40 consists of a predetermined identification code for the selected audio file 38, the second device 12 compares the received identification code with the identification codes of the audio files stored in the memory of the second device 12 to find a matching audio file to play. If the first signal 40 includes the entire selected audio file 38, the second device 12 may receive the entire selected audio file 38 and play the received audio file on the audio speaker 28.

Alternatively, the first signal 40 may include the attributes of the selected audio file 38. In this case, the second device 12 may compare the received attributes to the attributes of the audio files stored in the memory of the second device 12. The second device 12 then plays a matching audio file having attributes matching the received attributes. If more than one stored audio file matches the received attributes, the second device 12 may select a first such matching audio file or may selected one randomly from the group of matching audio files.

Preferably, the selected audio file 38 is displayed on the display 16 of the second device 12 when the selected audio file 38 is being played on or received by the second device 12.

After playback of the audio file on the second device 12, a user of the second device 12 may reply by selecting an audio file and transmitting a second signal 42 in reply in a manner similar to that described above. Upon receipt of the second signal 42, the first device 10 locates, displays and plays the audio file selected by the user of the second device 12 in the above manner.

Preferably, each device 10,12 has an audio file having a sequence attribute with an invitation value and another audio file having a sequence attribute with a reply value. Also, each device 10, 12 preferably has an audio file having a message type attribute with a positive value and another audio file with a message type attribute with a negative value. Further, each device 10,12 preferably has an audio file having a target gender attribute with a male value and another audio file with a target gender attribute with a female value.

Preferably, each device 10,12 is operable to receive new or updated audio files into the memory, which audio files may be received through the transceiver 18 from any suitable audio file source, such as personal computer or retail kiosk having a wireless transmitter, or other like audio file sources. Preferably, the audio file source includes means to add to or delete audio file on the device 10,12 and means to permit the user to modify the attributes of the audio files. Such means can include software operable to communicate with the device 10,12. Alternatively, each device 10,12 may include an interface to permit the user to delete audio files or to modify the attributes of the stored audio files. The interface can be accessed by a distinct button (not shown) on the device or by a predetermined combination of the buttons described above, or in another suitable manner.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A personal communication system, comprising:
   first and second portable communication devices, each device including:
   a display;
   a wireless transceiver;
   a memory having a plurality of stored audio files and having an identification code associated with each said audio file;
   a means to select a selected audio file from among said plurality of audio files, said audio file selection means being operable to permit a user to select one of said audio files; and
   an audio speaker;
   said wireless transceiver of said first portable communication device being operable to transmit a signal identifying said selected audio file selected by said user, said signal including a transmitted identification code associated with said selected audio file and not including said audio file;
   said wireless transceiver of said second portable communication device being operable to receive said signal;
   said second portable communication device being operable, upon receipt of said signal, to search for said selected audio file in said memory of said second portable communication device, via said transmitted identification code, and being operable to play said selected audio file on said audio speaker if said selected audio file is present in said memory of said second portable communication device;

said memory includes one or more attributes for each stored audio file, said attributes comprising a sequence attribute, a message type attribute or a target gender attribute;

said sequence, message type or target gender attribute has one or more of a plurality of predetermined values;

said sequence, message type or target gender attribute is associated with a characteristic of an associated audio file;

said audio file selection means is operable to receive one or more selections from said user of said predetermined values of said sequence, message type or target gender attributes;

said signal includes one or more attributes of said selected audio file;

said second portable communication device compares said attributes transmitted in said signal to attributes of audio files in said memory of said second device; and said second device plays an audio file having attributes matching said attributes in said signal;

whereby a suitable audio file is played on the second portable communication device if said selected audio file is not located on said second portable communication device via said transmitted identification code.

2. A personal communication system, as in claim 1, wherein:
said predetermined values of said sequence attribute comprise an invitation value and a reply value.

3. A personal communication system, as in claim 2 wherein:
said predetermined values of said sequence attribute further comprise an all sequence value.

4. A personal communication system, as in claim 2 wherein:
said predetermined values of said target gender attribute comprise a male value and a female value.

5. A personal communication system, as in claim 4 wherein:
said predetermined values of said target gender attribute comprise an all gender value.

6. A personal communication system as in claim 4, wherein:
one of said stored audio files has a male value target gender attribute; and
another of said stored audio files has a female value target gender attribute.

7. A personal communication system as in claim 2 wherein:
one of said stored audio files has an invitation value sequence attribute; and
another of said stored audio files has a reply value sequence attribute.

8. A personal communication system, as in claim 1, wherein said audio file selection means further comprising:
a matching audio file list on said display, said matching audio file list being limited to stored audio files having attributes matching a user selection of said predetermined values of said attributes; and
means to receive a user selection of a stored audio file from said matching audio file list.

9. A personal communication system, as in claim 1 wherein said means to receive user selections of said predetermined values of said audio file attributes comprises:
a plurality of attribute selection buttons, each button being associated with one of said sequence, target gender and message type attributes; and
each button being operable to loop through said predetermined values of an associated attribute in a predetermined order.

10. A personal communication system, comprising:
first and second portable communication devices, each device including:
a display;
a wireless transceiver;
a memory having a plurality of stored audio files;
a means to select a selected audio file from one of said audio files, said audio file selection means being operable to permit a user to select one of said audio files; and
an audio speaker;
said wireless transceiver of said first portable communication device being operable to transmit a signal identifying said selected audio file selected by said user, said signal not including said audio file;
said wireless transceiver of said second portable communication device being operable to receive said signal;
said second portable communication device being operable, upon receipt of said signal, to search for said selected audio file in said memory of said second portable communication device, and being operable to play said selected audio file on said audio speaker;
said memory including, for each stored audio file, a sequence attribute, a message type attribute and a target gender attribute, and each said attribute having one of a plurality of predetermined values;
said plurality of stored audio files including a variety of said predetermined values for each said sequence, message type and target gender attribute;
said attributes being associated with a characteristic of an associated audio file;
said audio file selection means being operable to receive selections from said user of said predetermined values of said attributes;
said signal includes said attributes of said selected audio file;
said second portable communication device, comparing said attributes transmitted in said signal to attributes of audio files in said memory of said second device; and
said second device playing an audio file having attributes matching said attributes in said signal.

* * * * *